UNITED STATES PATENT OFFICE 2,676,108

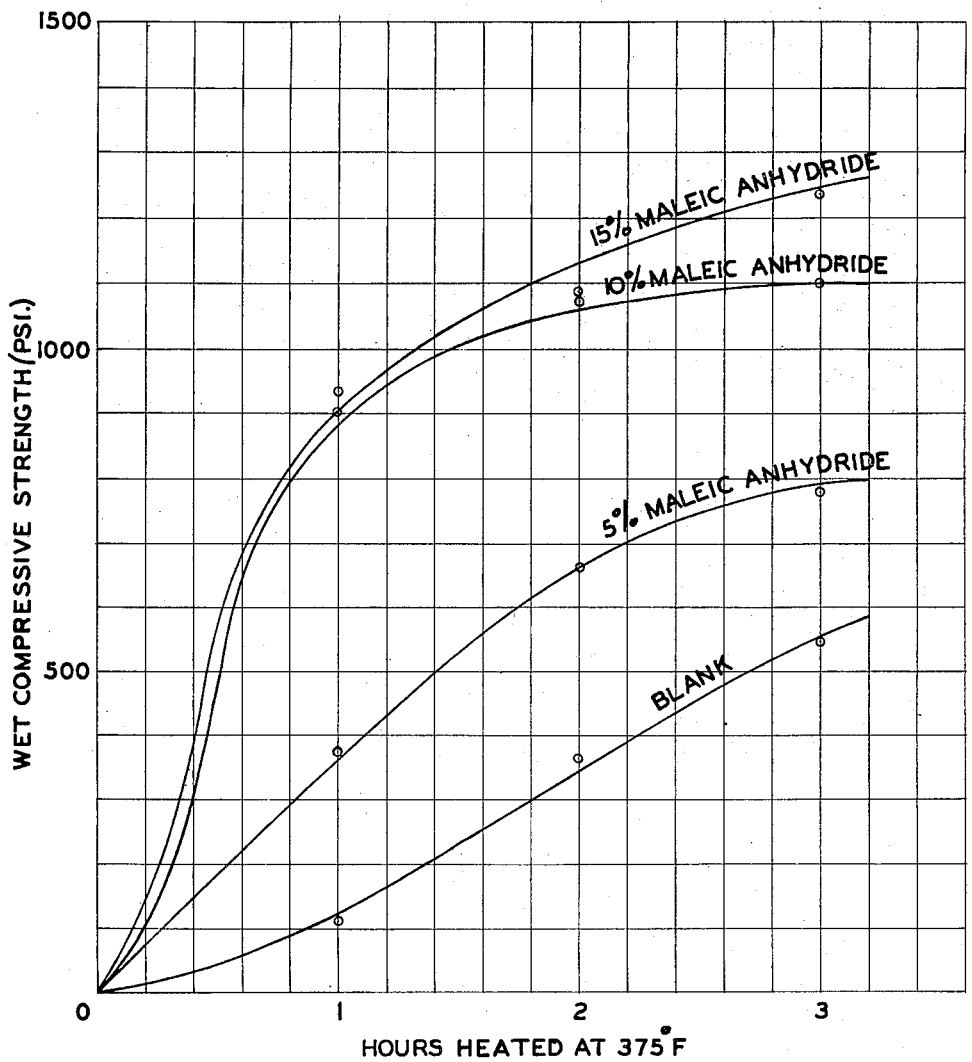

PROCESS OF PREPARING PLASTIC SUBSTANCES AND MOLD COMPOSITIONS AND PRODUCTS THEREOF

James M. Fuller and Thomas H. Walton, Laurel, Miss., assignors to Masonite Corporation, Laurel, Miss., a corporation of Delaware Application September 14, 1949, Serial No. 115,728

14 Claims. (Cl. 106—38.5)

This invention relates to the preparation of plastic substances or synthetic resins from a waste material resulting from the hydrolysis of lignocellulose material.

An object of this invention is to provide a process of utilizing an industrial waste material. A further object is to prepare useful plastic substances from an industrial waste material. A still further object is to provide a process of preparing molding and film forming thermosetting substantially water insoluble plastic substances from industrial waste material. A more particular object is to provide a process of preparing water insoluble resinous binders from the water soluble waste material resulting from the steam hydrolysis of lignocellulose material under pressure. Other objects will be apparent from the description of this invention given hereinafter.

The above objects are accomplished according to this invention by carrying out the process which comprises mixing (A) a member of the group consisting of polycarboxylic acids and anhydrides thereof with (B) the water soluble reaction product resulting from hydrolyzing lignocellulose material at an elevated temperature and pressure in the presence of moisture, and heating the mixture at a temperature and for a period of time sufficient to render the mixture substantially insoluble in water.

More specifically, good results have been obtained by heating said mixture at about 320° F.–482° F. for about four hours to five minutes, respectively.

The mixtures from which the products of this invention are prepared comprise the following constituents: (A) a member of the group consisting of polycarboxylic acids and anhydrides thereof and (B) the water soluble reaction product resulting from hydrolyzing lignocellulose material at an elevated temperature and pressure in the presence of moisture.

Examples of suitable materials under constituent (A) include the following acids and existing anhydrides thereof: maleic, phthalic, terephthalic, citric, succinic, oxalic, malic, tartaric, tartronic, adipic, furamic and sebacic.

The preferred source of constituent (B) used in this invention will now be described. In the manufacture of lignocellulose fiber boards or sheet products and the like, wood of trees and woody material of corn stalks, cane and other vegetable growths are first fibrated. One method of fibrating comprises charging a closed chamber (e. g. a gun as set forth in U. S. Patent No. 1,824,221) with relatively small wood chips or other woody material, subjecting the chips to pressure of about 200–1200 pounds per square inch and a temperature of about 200° C.–300° C. for approximately 30 minutes to 5 seconds, respectively, in the presence of steam, water or other moisture-supplying material, and then discharging the woody material from the gun through a constricted discharge opening therein, e. g., a valve, into a zone of lower pressure (preferably atmospheric pressure), while maintaining substantially the relatively high pressure in the gun, thereby explosively fibrating the wood or like material. The gun conditions may be varied so as to be suited to changes in kind of wood, size of chips (desirably up to about 1" long), water content of the chips (preferably about 25% or more), and the like. Under this treatment the wood undergoes hydrolysis and water insoluble and a readily hydrolyzable constituent thereof are rendered soluble or dispersible or suspendible in water. The term "water solubles" is used to include dispersible and suspendible material as well as dissolved material.

In the board making industry it has been found necessary to remove from the fiber the greater portion of these water solubles in order to obtain a water resistant and good board. Removal may be accomplished by squeezing the fiber with rolls or screws and the like apparatus or by washing the fiber in water. In the latter case the fiber is passed into a tank and slurried with water and then delivered to and processed by a washer (preferably a countercurrent washer) thereby extracting the water solubles to such an extent that the extract obtained ordinarily contains about 8% of water solubles. A smaller part of the water solubles remains in the waste fiber used for making into boards or the like.

The hemicellulose fraction of wood, being made up of high molecular weight hexosans and pentosans and comprising some 20% of the original woody tissue, in large part gives rise to the water solubles and is believed to undergo the greatest change during the thermohydrolytic process described above. It is believed this hydrolysis affects a moderate reduction in the molecular weight of the hexosan and pentosan units in producing hexosan and pentosan units soluble in water. These units plus a small amount of lignin (the water properties of which are similarly affected by the hydrolysis), non-sugar carbohydrates and gums, make up the bulk of the constituents of the water solubles.

Water solubles made by hydrolysis of lignocellulose and preferably water solubles made by the treatment of lignocellulose as described above are well adapted for use in this invention. A typical analysis of the water solubles made from pine wood and useful in this invention is given in the following table.

TABLE 1

*Constituents of water solubles (bone dry basis)*

| Constituents: | Parts by weight |
|---|---|
| Hexosans | 40 |
| Pentosans | 30 |
| Non-sugar carbohydrates | 10 |
| Lignin | 15 |
| Gums | 5 |
| | 100 |

The constituents of the water solubles may vary somewhat depending on the type lignocellulose material hydrolyzed and the conditions, e. g. time, temperature, pressure, etc., under which the lignocellulose material is hydrolyzed. Depending upon the above conditions, the constituents of the water solubles can vary roughly as shown in the following table.

TABLE 2

*Constituents of water solubles (bone dry basis)*

| Constituents: | Parts by weight |
|---|---|
| Pentosans and hexosans | 60–80 |
| Lignin | 5–25 |
| Non-sugar carbohydrates | 5–15 |
| Gums | 2–8 |

Preferably the water solubles are concentrated by the evaporation of moisture before using. Concentration to about 35%–55% by weight solids content is satisfactory. Optionally, water solubles in the form of a substantially dry powder may be used. These water solubles are sold in liquid and powder form under the trade-marks Masonex and Masonoid, respectively. They will be referred to as such hereinafter in this specification. It is to be understood that the definition of the water solubles (constituent B) as given in the claims includes either form, because for the purposes of this invention Masonex and Masonoid are substantially equivalent.

It has been found according to this invention in general that plastic substances can be prepared by mixing a polycarboxylic acid or anhydride thereof with these water solubles and heating the mixture.

The drawing shows graphically the increase in wet compressive strength of foundry cores baked with Masonoid plus maleic anhydride binder as against cores baked with Masonoid alone as the binder.

The following examples illustrate specific embodiments of this invention. Parts and percent are by weight unless otherwise indicated. Solubilities are shown as per Grant, Hackk's Chemical Dictionary, 3rd ed., The Blakiston Co., Philadelphia, 1946, pp. 787. Glossary for tables in Examples I, II and III: FS means freely soluble; SS—slowly soluble; VS—very soluble; VSS—very slightly soluble; SpS—Sparingly soluble; I—insoluble.

EXAMPLE I

*Preparing plastic substance in bulk and as molded articles*

9.5 parts Masonoid and 0.5 part additives (5.26%), as identified in table below, were well mixed. The mixture was heated for five minutes at the various temperatures indicated in Table 3. 10 parts Masonoid alone was run as a blank for each temperature employed. Instantaneous fusion point and solubility in cold water were determined after heating. Specimens 9, 11 and 12 were molded at 380° F. and 1000 p. s. i.

TABLE 3

| Specimen No. | Parts Masonoid | Parts Additive | Heating 5 Mins. at ° F.* | Instantaneous fusion Point, ° F.* | Cold Water Solubility |
|---|---|---|---|---|---|
| 1 | 10 | None | 401 | 446 | FS |
| 2 | 9.5 | 0.5 Maleic Anhydride | 401 | 457 | SS |
| 3 | 9.5 | 0.5 Citric Acid | 401 | 453 | SS |
| 4 | 10 | None | 428 | 446 | SS |
| 5 | 9.5 | 0.5 Maleic Anhydride | 428 | 505 | SS |
| 6 | 9.5 | 0.5 Citric Acid | 428 | 505 | SS |
| 7 | 10 | None | 455 | 468 | SS |
| 8 | 9.5 | 0.5 Maleic Anhydride | 455 | 541 | SS |
| 9 | 9.5 | 0.5 Citric Acid | 455 | 561 | SS |
| 10 | 10 | None | 482 | 608 | SS |
| 11 | 9.5 | 0.5 Maleic Anhydride | 482 | 752 | SS |
| 12 | 9.5 | 0.5 Citric Acid | 482 | 666 | SS |

*Apparatus used is described in J. A. C. S. 52, 3/28–3132 (1930).

EXAMPLE II

*Preparing plastic substance as films*

10 parts Masonex of 38.4% (3.84 parts solids) was well mixed with one part additive (26% of Masonex solids) as identified in table below. From this mixture slides were prepared and heated as indicated in Table 4. For each condition of heating a blank was run with the Masonex alone.

TABLE 4

| Additives | Heating Conditions and Cold Water Solubility | | |
|---|---|---|---|
| | 120 Min. @ 320° F. | 30 Min. @ 374° F. | 60 Min. @ 374° F. |
| None | VS | SpS | SS |
| Citric Acid | VSS | I | I |
| Maleic Anhydride | VSS | VSS | I |
| Oxalic Acid | SS | VSS | I |
| Succinic Acid | SS | SS | I |
| Phthalic Anhydride | SS | SS | VSS |

EXAMPLE III

*Preparing plastic substances as films*

100 parts Masonex of 39% (39 parts solids) was well mixed with 13 parts citric acid (33⅓% of Masonex solids). From this mixture slides were prepared and heated as shown in Table 5.

TABLE 5

| Heating Conditions | | Cold Water Solubility |
|---|---|---|
| Time, Mins. | Temp., °F. | |
| 60 | 374 | I |
| 30 | 374 | I |
| 30 | 356 | I |
| 240 | 320 | I |
| 30 | 347 | VSS |
| 60 | 320 | SS |

Test specimens were prepared as follows: Each batch was mixed dry 15 minutes, the water added and then mixed an additional 15 minutes. Mixing was by Baker-Perkins mixer. Green cores were made by pressing 175 parts of the mixture in a split mold at 1000 p. s. i. These cores were baked in a forced draft oven under the conditions shown. Dry compressive strengths were obtained after aging the baked cores 24 hours at room temperatures. Wet compressive strengths were obtained after subjecting the baked cores to 90% relative humidity at 90° F. for 24 hours. All compressive strength tests were made on a Baldwin-Southwark Universal testing machine.

TABLE 6

*Dry and wet compressive strengths (p. s. i.)*

| Baking conditions | Test | ADDITIVE | | | | | | | | |
|---|---|---|---|---|---|---|---|---|---|---|
| | | Maleic anhydride | | | Phthalic anhydride | | | Citric acid | | |
| | | 5% | 10% | 15% | 5% | 10% | 15% | 5% | 10% | 15% |
| 1 Hr. @ 325° F | Dry, 350 / Wet, 0 | | 1,136 / 113 | | | | | | | |
| 2 Hrs. @ 325° F | Dry, 410 / Wet, 42 | | 1,705 / 466 | | | | | | | |
| 3 Hrs. @ 325° F | Dry, 501 / Wet, 75 | | 1,785 / 556 | | | | | | | |
| 1 Hr. @ 375° F | Dry, 632 / Wet, 106 | 1,595 / 375 | 1,630 / 930 | 2,350 / 900 | 537 / 187 | 930 / 402 | 913 / 484 | 1,485 / 804 | 1,915 / 1,095 | 1,935 / 1,360 |
| 2 Hrs. @ 375° F | Dry, 970 / Wet, 371 | 1,625 / 670 | 2,000 / 1,085 | 2,200 / 1,080 | 1,150 / 486 | 920 / 675 | 774 / 710 | 1,295 / 1,080 | 1,780 / 1,020 | 2,065 / 1,310 |
| 3 Hrs. @ 375° F | Dry, 1,210 / Wet, 550 | 1,750 / 777 | 1,640 / 1,111 | 2,270 / 1,235 | 1,100 / 670 | 1,230 / 735 | 1,000 / 818 | 1,350 / 940 | 1,380 / 995 | 2,320 / 1,855 |
| ¼ Hr. @ 425° F | Dry, 409 / Wet, 0 | | 918 / 105 | | | | | | | |
| ½ Hr. @ 425° F | Dry, 986 / Wet, 641 | | 1,670 / 1,105 | | | | | | | |
| 1 Hr. @ 425° F | Dry, 1,500 / Wet, 1,275 | | 2,000 / 1,675 | | | | | | | |
| 2 Hrs. @ 425° F | Dry, 1,275 / Wet, 1,145 | | 1,900 / 1,710 | | | | | | | |
| 3 Hrs. @ 425° F | Dry, 1,225 / Wet, 1,185 | | 1,715 / 1,640 | | | | | | | |

EXAMPLE IV

*Preparing plastic substances as films (plasticized)*

100 parts Masonex of 39% (39 parts solids), 13 parts citric acid (33⅓% of Masonex solids) and 10.4 parts plasticizer (20% based on Masonex solids and citric acid) were well mixed. From this mixture slides were prepared and heated at 374° F. for 30 minutes. The following materials acted as plasticizers by increasing the flexibility of these films: Tung oil, Turkey-red oil, dibutyl phthalate, diethyl phthalate, dimethoxy tetraethylene glycol, triacetin, and sodium benzoate.

EXAMPLE V

*Preparing foundry sand cores while forming plastic substance in situ in the cores as binder therefor*

Standard cylindrical foundry test specimens 2" x 2" were prepared from four different type mixtures. Included in all mixtures were 2437.5 parts sand, 50 parts water and 62.5 parts Masonoid. These constituents alone formed the mixture which was used to make the blank test specimens. In addition to these constituents the other type mixture contained various amounts of maleic anhydride, phthalic anhydride and citric acids as indicated in Table 6 under "additive." The 5%, 10% and 15% additive is by weight of the Masonoid and amounts to 3.125, 6.25 and 9.375 parts, respectively.

The foregoing examples have been presented to illustrate specific embodiments of this invention rather than to serve as limitations thereon. Proportions of constituents in the mixture may be varied; fairly wide variations have been shown in the examples to produce useful products. Various conventional plasticizers may be used in preparing the plastic molding and film-forming substances of this invention. These plastic molding substances may be used in combination with other molding compounds with which they are compatible and either with or without filler.

While good results have been obtained by employing a heating cycle of 320° F.–482° F. for four hours to five minutes, respectively, other heating conditions may be used so long as a substantially water-insoluble product is obtained. From the examples it will be seen that temperature and time vary inversely.

Although application of this invention to binders has not been illustrated beyond the preparation of foundry cores, it can be used to advantage in binding finely divided materials in general wherein a substantially water-insoluble binder is desired. The amount of binder used will vary depending on the nature of the material being bound. In forming foundry sand cores, 2½% Masonoid based on the total mixture plus 5%–15% additive based on the Masonoid gave excellent results. The drawing shows that 5% of the maleic anyhride additive substantially improved the wet compressive strength of the baked foundry cores; and that 10% of said additive resulted in a further substantial increase in wet compressive strength, whereas 15% of said additive gave only a relatively small increase over 10% additive. The heating cycle is sufficiently flexible to be adapted to foundry practices and also the practices in binding various types of finely divided materials.

As many apparently widely different embodiments of this invention may be made without departing from the spirit and scope thereof, it is to be understood that the invention is not to be limited to the specific embodiments thereof except as defined in the appended claims.

We claim:

1. Process of preparing foundry sand cores which comprises mixing sand with a binder therefor and water, subjecting said mixture to pressure in a mold having the size and shape of the desired finished product to form a shaped body thereof, heating said shaped body at a temperature and for a period of time sufficient to convert said binder into a strong binder substantially insoluble in water, said binder being selected from a member of the group consisting of (A) polycarboxylic acids containing only carbon, hydrogen, and oxygen and anhydrides thereof in admixture with (B) the water-soluble reaction product containing from about 60% to about 80% of pentosans and hexosans resulting from hydrolyzing lignocellulose material at an elevated temperature and pressure in the presence of moisture.

2. The product of the process of claim 1.

3. Process of preparing foundry sand cores which comprises mixing sand with a binder therefor and water, subjecting said mixture to pressure in a mold having the size and shape of the desired finished product to form a shaped body thereof, heating said shaped body at a temperature of about 325° F.-425° F. for about three hours to ¼ hour, respectively, said binder being selected from a member of the group consisting of (A) polycarboxylic acids containing only carbon, hydrogen, and oxygen and anhydrides thereof in admixture with (B) the water-soluble reaction product containing from about 60% to about 80% of pentosans and hexosans resulting from hydrolyzing lignocellulose material at an elevated temperature and pressure in the presence of moisture.

4. Process of claim 1, and in which constituent (A) is maleic anhydride.

5. The product of the process of claim 4.

6. Process of claim 1, and in which constituent (A) is citric acid.

7. The product of the process of claim 6.

8. Process of claim 1, and in which constituent (A) is succinic acid.

9. The product of the process of claim 8.

10. Process of claim 1, in which constituent (A) is about 5%-15% by weight of the solids content of constituent (B), and in which constituents (A) and (B), solids basis are about 2.5% by weight of the total mixture.

11. The plastic composition obtained by mixing (A) a member of the group consisting of polycarboxylic acids and anhydrides thereof containing only carbon, hydrogen, and oxygen with (B) the water-soluble reaction product containing from about 60 to about 80 parts by weight of pentosans and hexosans resulting from hydrolyzing lignocellulose material at an elevated temperature and pressure in the presence of moisture, and heating the mixture at a temperature and for a period of time sufficient to render the mixture substantially insoluble in water.

12. The plastic composition obtained by mixing maleic anhydride with the water-soluble reaction product containing from about 60 to about 80 parts by weight of pentosans and hexosans resulting from hydrolyzing lignocellulose material at an elevated temperature and pressure in the presence of moisture, and heating the mixture at a temperature and for a period of time sufficient to render the mixture substantially insoluble in water.

13. The plastic composition obtained by mixing citric acid with the water-soluble reaction product containing from about 60 to about 80 parts by weight of pentosans and hexosans resulting from hydrolyzing lignocellulose material at an elevated temperature and pressure in the presence of moisture, and heating the mixture at a temperature and for a period of time sufficient to render the mixture substantially insoluble in water.

14. The plastic composition obtained by mixing succinic acid with the water-soluble reaction product containing from about 60 to about 80 parts by weight of pentosans and hexosans resulting from hydrolyzing lignocellulose material at an elevated temperature and pressure in the presence of moisture, and heating the mixture at a temperature and for a period of time sufficient to render the mixture substantially insoluble in water.

References Cited in the file of this patent

UNITED STATES PATENTS

| Number | Name | Date |
| --- | --- | --- |
| 1,091,690 | Moore | Mar. 31, 1914 |
| 1,977,728 | Leach | Oct. 23, 1934 |
| 2,156,160 | Olson | Apr. 25, 1939 |
| 2,242,601 | Wallace | May 20, 1941 |
| 2,418,293 | Farber | Apr. 1, 1947 |
| 2,429,102 | Lewis | Oct. 14, 1947 |
| 2,433,168 | Staeger | Dec. 23, 1947 |
| 2,448,624 | Rummelsburg | Sept. 7, 1948 |
| 2,549,822 | Koonce | Apr. 24, 1951 |

FOREIGN PATENTS

| Number | Country | Date |
| --- | --- | --- |
| 348,315 | Great Britain | May 14, 1931 |
| 573,171 | Great Britain | Nov. 8, 1945 |